United States Patent Office.

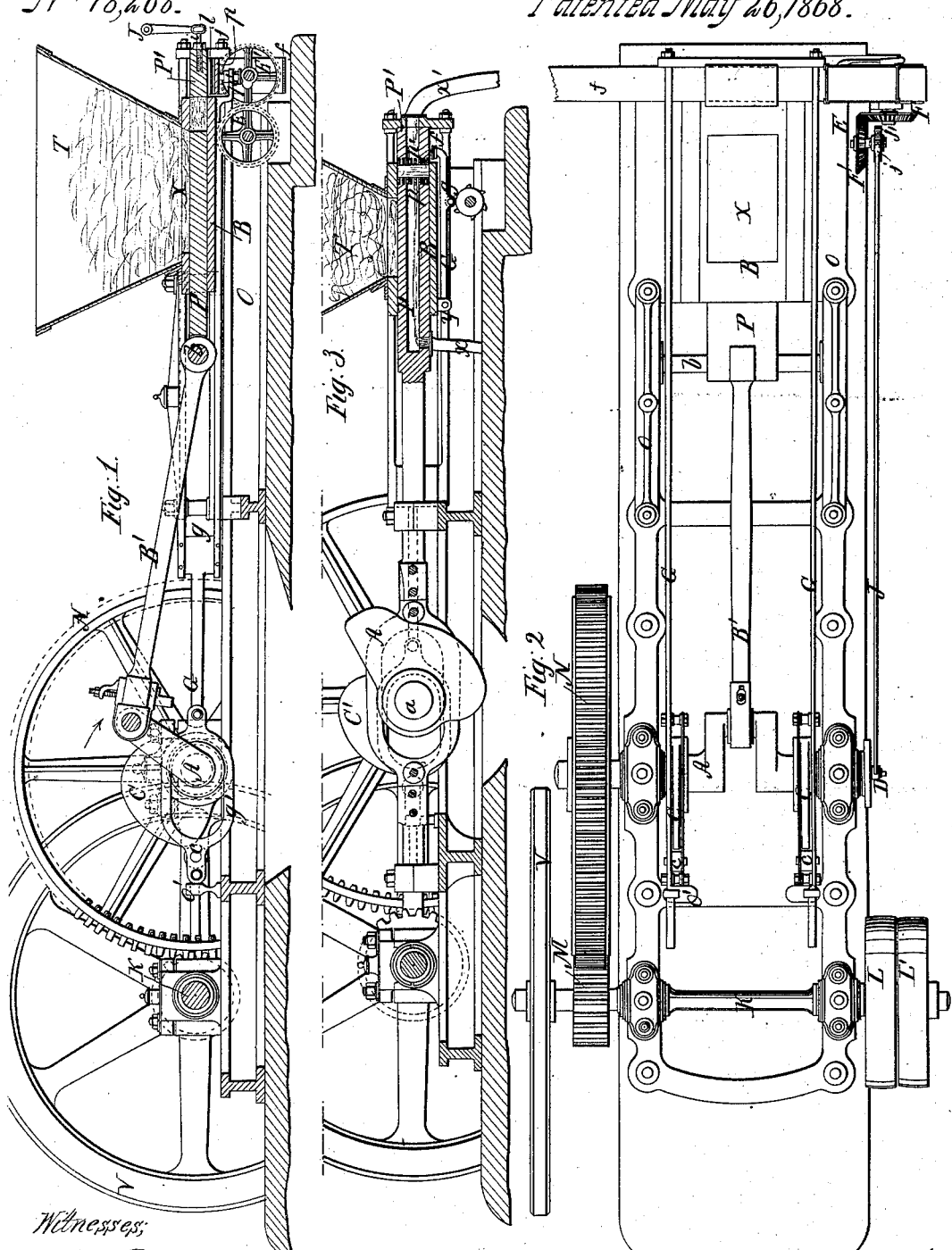

FRANÇOIS DURAND, OF PARIS, FRANCE.

Letters Patent No. 78,268, dated May 26, 1868.

IMPROVED BRICK-MACHINE.

The Schedule referred to in these Letters Patent and making part of the same.

TO ALL WHOM IT MAY CONCERN:

Be it known that I, FRANÇOIS DURAND, of Paris, in the Empire of France, have invented some new and useful Improvements in Machines for Pressing or Moulding Bricks, tiles, or for pressing pulp and other matters; and I do hereby declare that the following is a full, clear, and exact description thereof, which will enable those skilled in the art to make and use the same, reference being had to the accompanying drawings, forming part of this specification.

In principle, the moulding or pressing is effected in a box or compartment, surmounted by a hopper, in which is placed the matter which it is to receive. This box or compartment is fixed to a framework, carrying the several mechanical devices, and is always open, receiving the matter to be pressed by its weight in the hopper.

The horizontal or side pressure is produced by a piston, operated by a crank or eccentric, which receives its motion from a driving-shaft. The moulding operates automatically, and the bricks, blocks, tiles, according to their manufacture, are conveyed away by an endless belt, receiving its motion from the driving-shaft.

The only modification which it is necessary to make in the machine, when pressing pulps, consists in using a hollow piston instead of a solid piston, which is used when moulding bricks, blocks, or tiles.

I will now proceed to describe the arrangement and operation of the parts to the machine, reference being had to the accompanying plate of drawings, in which—

Figure 1 is a longitudial section of the machine for moulding bricks, blocks, &c., and Figure 2 a plan or top view.

Similar letters of reference indicate corresponding parts.

B, in the drawings, is the box, in which the moulding takes place. This box is rigidly fixed to or formed as a part of the frame O, carrying the operating-mechanism.

The box B is provided with an opening in its upper side, forming a passage for the material contained in the hopper T, which is fixed above the box.

The moulding is effected by the rectilinear movement of the piston, P, which is operated through a pitman-rod, B', connecting it with the crank-end of the shaft A.

The pin $b$, by which the rod B' is hung to the piston P, is extended from each side of the same, into grooves, $g$, of the rods G, disposed parallel with the framework.

The rear piston or presser, P', is fixed to the bars or rods G, and it partaks of their movement; and they are prevented from being longitudinally displaced, by bearing-blocks or guides, O, arranged in the framework. The driving-shaft A works the grooved bars G, and the pin $b$ traverses the groove $g$.

On the shaft A, each side of the crank-portion thereto, are mounted cams C, which act upon the inside of the yoke-frames C, of the rods or bars G.

While the circular portions of the cams $c$ are acting upon the yokes C, the rear piston, P', remains stationary, and the compression of the clay takes place.

The driving-shaft turns in the direction of the arrow, and the position of the piston P, as is indicated in the drawings, is that when it has completed the compression, that is to say, when the circumference of the cams C have ceased to act upon the yokes $c$.

The axis or pin $b$ then comes in contact with the forward ends of the grooves $g$, and the piston P, continuing its forward movement, discharges the mould in the following manner:

The bars or rods G, being no longer retained by the cams $c$, move with the piston, and consequently carry back the rear piston P', until the piston has arrived at the ends of its movement.

As the two pistons maintain a perfect parallelism, it follows that the brick or tile is moved along without being subjected or liable to the least alteration in form.

The discharge of the mould is executed entirely automatically, and the brick is removed by a mechanism suitable therefor, as, for instance, an endless belt or band, placed transversely to the end of the machine, and arranged to receive its movement by a gear-wheel, F, engaged with another gear-wheel, F', mounted upon an axis or shaft, E, which is operated by a catch, *j*, driven by a rod, J', and an eccentric-disk, D, keyed upon the driving-shaft, and acting upon a ratchet-wheel, *j'*.

The said axis carries another gear-wheel, which engages with a gear of same diameter, keyed upon another shaft, provided with a cam, *e'*.

This cam has to raise, at the moment desired, a disk, provided to receive the moulded bricks, which disk is located under the endless belt, and is furnished with two rods, passing into two fixed guides, that hold it always parallel, which are fastened at their bottom to a small cross-bar, which is placed in contact with the cam just above referred to.

When the piston has reached the extreme limit of its movement, the brick delivered from the machine is received upon the endless belt or table, the weight of which brick is taken by the plate arranged and connected therewith, that at that moment is raised by the cam, when the moulding is completed.

To avoid the putting out of shape of the bricks, the endless apron is provided with props located at convenient distances, which props are for the purpose of bringing shelves successively into place, or one after the other. These shelves are placed above, in a small frame, located upon the side, and place themselves upon the endless apron.

Each brick is set upon a separate shelf, which permits of its being carried to the dry-house or kiln without danger of being injured.

The cams C, after the moulding, again act upon the yokes *c*, drawing back the rear piston P' into its original position, for effecting the moulding of another brick, and so on.

The frame O supports a shaft, K, on which are mounted two pulleys, a fixed and a loose one, a fly-wheel, and a pinion-wheel that is engaged with a large gear-wheel, N, keyed upon the shaft A.

The fixed and loose pulleys may receive their movement from any motor whatever for transmitting it to the shaft A, through which all the parts of the machine are driven.

The peculiarity of my machine, and which gives to it a special character, is that the clay is thrown into the hopper without any preparation, except being gathered together, and that the compression in the vertical direction is only produced by the weight of the clay itself accumulated in the hopper.

In fig. 1, by red lines, an arrangement of mechanism is shown to adapt the machine to the manufacture of hollow bricks, which consists in a series of pins, *i*, working through the rear piston P', and all secured to a rod or bar, that at its extremities is operated by two levers, *j*, mounted upon an oscillating-axis, J. This axis is operated by any suitable disposition of parts, which it is not necessary to indicate upon the drawings.

When the pressure has arrived at its limit, the cams C and C', which move the rear piston P', ceasing to act, it becomes free, and the piston P, continuing its movement, forces outward what remains of the matter, under the form of blocks or bricks.

The movement of the piston P is determined by the cam A, which, as with the cams C and C', is keyed upon the shaft *a*.

The form of the cams C C' and A, is to be such that in the first part of the operation, consisting in introducing the matter into the mould, the movements that are imparted to both pistons will be sufficiently rapid, while at the time of compression the movements will be very slow, in order to augment the power of the machine.

I claim as new, and desire to secure by Letters Patent—

1. The combination of the pin *b*, pitman B', pistons P P', grooved bars G, cams *c*, yokes C', and crank-shaft A, all arranged and operating as herein described for the purpose specified.

2. The combination of the eccentric-disk D, connecting-rod J', gear-wheels F F', ratchet *j'*, upon shaft E, the catch *j*, and the oscillating-arm or disk as herein described for the purpose specified.

In testimony whereof, I have signed my name to this specification in presence of two subscribing witnesses.

FR. DURAND.

Witnesses:
G. RIMAUX,
JAMES HAND.